United States Patent
Knotts et al.

(10) Patent No.: US 7,551,989 B2
(45) Date of Patent: Jun. 23, 2009

(54) AUTONOMOUS OUTER LOOP CONTROL OF MAN-RATED FLY-BY-WIRE AIRCRAFT

(75) Inventors: Louis H. Knotts, North Tonawanda, NY (US); Eric E. Ohmit, Eden, NY (US)

(73) Assignee: Calspan Corporation, Buffalo, NY (US)

(*) Notice: Subject to any disclaimer, the term of this patent is extended or adjusted under 35 U.S.C. 154(b) by 188 days.

(21) Appl. No.: 11/425,600

(22) Filed: Jun. 21, 2006

(65) Prior Publication Data

US 2009/0012657 A1     Jan. 8, 2009

(51) Int. Cl.
*B64C 13/20*     (2006.01)
(52) U.S. Cl. .................... 701/3; 701/2; 244/189
(58) Field of Classification Search ............ 244/196, 244/221, 189; 701/2, 3; 340/945
See application file for complete search history.

(56) References Cited

U.S. PATENT DOCUMENTS

| | | | |
|---|---|---|---|
| 4,646,241 A | 2/1987 | Ratchford et al. | |
| 4,855,822 A | 8/1989 | Narendra et al. | |
| 5,240,207 A | 8/1993 | Eiband et al. | |
| 6,181,989 B1 | 1/2001 | Gwozdecki | |
| 6,443,399 B1* | 9/2002 | Yount et al. | 244/196 |
| 6,742,741 B1 | 6/2004 | Rivoli | |
| 7,099,752 B1* | 8/2006 | Lenell et al. | 701/2 |
| 2004/0217232 A1* | 11/2004 | Yount et al. | 244/76 R |

OTHER PUBLICATIONS

Lee W. Young; Patent Cooperation Treaty PCT International Search Report for PCT/US07/69749; Nov. 3, 2008.
Lee W. Young; Written Opinion of the International Searching Authority for PCT/US07/69749; Nov. 3, 2008.

* cited by examiner

*Primary Examiner*—Mark Hellner
(74) *Attorney, Agent, or Firm*—Daniel P. Malley; Bond, Schoeneck & King, PLLC

(57) ABSTRACT

The present invention is directed to a control system for use on a fly-by-wire (FBW) aircraft. The system includes a controller coupled to the FBW aircraft. The controller is configured to generate a plurality of simulated pilot control signals from at least one aircraft maneuver command. The plurality of simulated pilot control signals are generated in accordance with a predetermined control law. The at least one aircraft maneuver command is derived from at least one command telemetry signal received from a remote control system not disposed on the FBW aircraft. The plurality of simulated pilot control signals are configured to direct the FBW aircraft to perform an aircraft maneuver in accordance with the at least one aircraft maneuver command.

31 Claims, 5 Drawing Sheets

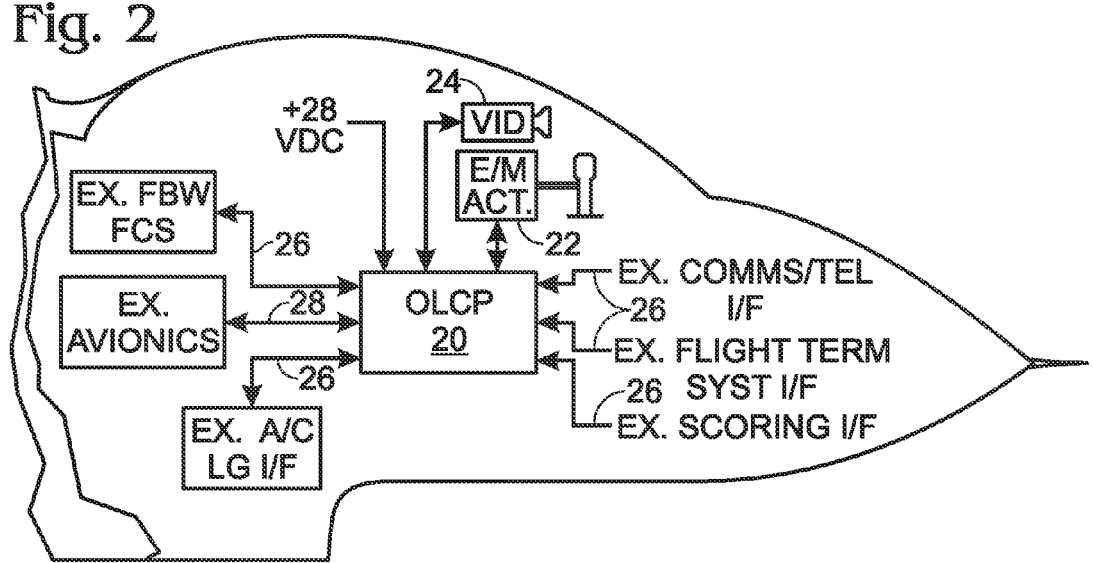
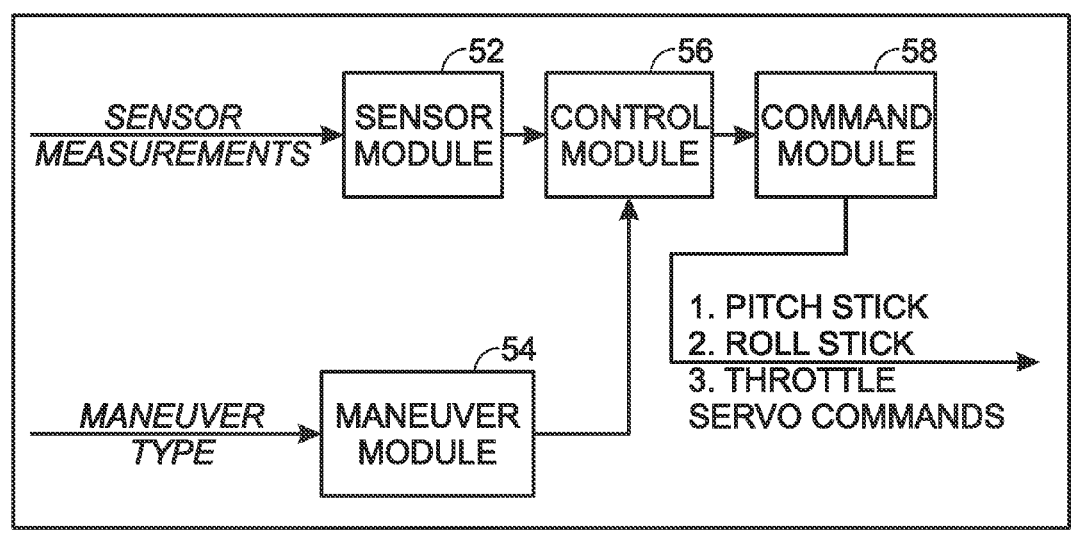

AUTONOMOUS OUTER LOOP CONTROL OF MAN-RATED FLY-BY-WIRE AIRCRAFT

BACKGROUND OF THE INVENTION

1. Field of the Invention

The present invention relates generally to flight control systems, and particularly to fly-by-wire flight control systems for unmanned airborne vehicles (UAVs).

2. Technical Background

The market for UAVs is growing and is in the range of several billion dollars per year. UAVs may be used for many purposes including aerial surveillance, weapons delivery, and target training. Many UAVs are used as target drones by providing military pilots with realistic, high performance targets during airborne training. Irregardless of the use, one method for making a UAV is by converting a retired man-rated aircraft into an unmanned vehicle that is remote controlled or preprogrammed to follow a predetermined trajectory. The process of conversion typically involves modifying the retired aircraft's flight control system. A discussion of basic aircraft terminology may be useful before presenting some of the conventional approaches for converting retired aircraft into target drones.

Note that a typical aircraft includes a fuselage, wings, one or more engines, and a tail section that includes horizontal stabilizers and a vertical stabilizer. The engines generate the thrust that drives the aircraft forward and the wings provide the lift necessary for the aircraft to become airborne. Control surfaces are disposed on the wings, the horizontal stabilizers and the vertical stabilizer. The control surfaces enable the aircraft to respond to the flight control system command inputs provided by the pilot(s) by directing air flow in a controlled manner. The major control surfaces disposed on the typical aircraft are the ailerons, the elevators, and the rudder.

The ailerons are disposed on the trailing edges of the wings and are used to control the roll of the aircraft. Roll refers to the tendency of the aircraft to rotate about the aircraft's central longitudinal axis. If the pilot moves the control stick (or alternatively the control wheel) to the left, the left aileron will rise and the right aileron will fall and the aircraft will begin rolling to the port side. In like manner, if the control stick is moved to the right, the aircraft will roll to the starboard side. The elevators are disposed on the rear edges of the horizontal stabilizers and are used to control the aircraft pitch. Pitch refers to the tendency of the aircraft to rotate around the transverse axis of the aircraft. For example, if the pilot adjusts the control stick aft, the elevators will cause the nose to pitch upward and the aircraft will tend to lose airspeed. If the stick is moved foreword, the nose of the aircraft pitches downward.

The rudder is disposed on the vertical stabilizer and is usually employed to adjust the yaw of the aircraft. The yaw is the tendency of the aircraft to rotate around the vertical axis, i.e., the axis normal to the longitudinal axis and the transverse axis. The rudder is typically controlled by a pair of foot-operated pedals.

The aircraft may also include secondary control surfaces such as spoilers, flaps, and slats. The spoilers are also located on the wings and are employed for a variety of functions. The flaps and the slats are also disposed on the wing and are typically used to adjust the aircraft's lift and drag during landing and take off. As noted above, the means for transmitting the pilot's commands to the above described control surfaces is commonly referred to as the flight control system.

In the description provided above, the most common control surfaces were discussed. However, those of ordinary skill in the art will understand that aircraft may employ other such control surfaces such as flaperons, elevons, ruddervators, and thrust vectoring nozzles to name a few. A flaperon is a combination flap and aileron and is used, for example, on the F-16. An eleven is a combination elevator and aileron and is used on flying wing aircraft and delta-wing aircraft such as the B-2, F-106, B-58, etc. The ruddervator is a combination of the rudder and the elevator and is used, for example, on the F-117. The F-22 also employs a specialized control surface known as a thrust vectoring nozzle in addition to the horizontal stabilizer.

The flight control system is designed to actuate the control surfaces of the aircraft, allowing the pilot to fly the aircraft. The flight control system is, therefore, the control linkage disposed between the control input mechanisms, i.e., the control stick, pedals and the like, and the control surface actuator devices. One criteria of flight control system design relates to the aircraft's handling characteristics. The flight control system is also designed and implemented in accordance with certain specifications that ensure a very high level of reliability, redundancy and safety. These issues are especially important for man-rated aircraft, i.e., those that are to be flown by a pilot, and carry aircrew or passengers. The system's reliability and redundancy ensures that there is a very low probability of failure and the resulting loss of the aircraft and life due to a control system malfunction. All of these factors ensure that the airplane can be operated safety with a minimum risk to human life.

In older aircraft, the control stick and the pedals are coupled to the control surfaces by a direct mechanical linkage. The pilot's commands are mechanically or hydraulically transferred to the control surface. The pilot's control inputs are connected to hydraulic actuator systems that move the control surfaces by a system of cables and/or pushrods. In recent years, aircraft having flight control systems featuring direct mechanical linkages have been replaced by newer aircraft that are equipped with an electrical linkage system commonly referred to as a fly-by-wire system.

A fly-by-wire system translates the pilot's commands into electrical signals by transducers coupled to the control stick and the pedals. The electrical signals are interpreted by redundant flight control computers. Thus, the flight control system performs multiple digital or analog processes that combine the pilot's inputs with the measurements of the aircraft's movements (from its sensors) to determine how to direct the control surfaces. The commands are typically directed to redundant control surface actuators. The control surface actuators control the hydraulic systems that physically move the control surface of the aircraft.

After a man-rated aircraft is retired, it may be re-used for airborne missions that do not require a pilot or on-board crew. This type of aircraft, known as an Unmanned Air Vehicle (UAV) or Target Drone is modified to take advantage of the existing systems by replacing the functionality typically provided by a pilot. The flight control system may be changed in order to allow control by a ground controller. Alternatively, conversion is implemented by modifying flight control processor logic to merge external sensor signals and commands into the control surface commands that drive the UAV.

Currently, the primary aircraft employed for full-scale target missions is the F-4 Phantom fighter aircraft, which is a 1960's vintage aircraft. Retired F-4 Phantom aircraft have been used as target drones for several years. Approximately 5,000 F-4s were produced over the years. Unfortunately, the fleet of available F-4 aircraft is dwindling and the supply of F-4 aircraft will soon be depleted. This problem may be solved by pressing newer retired fly-by-wire aircraft (such as the F-16 or F-18) into service to meet the demand for target drones. However, it must be noted that the F-4 Phantom is not a fly-by-wire system. The F-4 is equipped with an older hydro-mechanical flight control system. Accordingly, different technological means are required to convert the newer fly-by-wire aircraft into target drones.

In one approach, fly-by-wire conversion methods requiring flight control computer re-programming are being considered. In another approach that is being considered, the flight control computer is removed altogether and replaced with a new computer. The new computer is programmed to perform the functions normally performed by the pilot, in addition to the traditional flight control system functions. However, both of these approaches have their drawbacks. Reprogramming or replacing the original man-rated flight control processor is a complex and costly proposition. The new flight control processor has to pass many, if not all, of the aircraft development tests originally required. The fact that most of the fly-by-wire aircraft expected to be used for this application are now more than 20 years old further complicates matters. The designers of the new replacement systems are faced with replicating the original system's functions and capabilities without having the necessary documentation. The system design and test definitions for these functions have been lost over time.

Accordingly, the effort required to replicate and prove a replacement system having identical fit/form/function and repeat the required development testing has been found to be prohibitively expensive. What is needed is an alternative, and less expensive, method for converting retired fly-by-wire aircraft into UAVs and/or target drones.

SUMMARY OF THE INVENTION

The present invention addresses the needs described above by providing a system and method for converting a fly-by-wire aircraft into a UAV.

One aspect of the present invention is directed to a control system for use on a fly-by-wire (FBW) aircraft. The system includes a controller coupled to the FBW aircraft. The controller is configured to generate a plurality of simulated pilot control signals from at least one aircraft maneuver command. The plurality of simulated pilot control signals are generated in accordance with a predetermined control law. The at least one aircraft maneuver command is derived from at least one command telemetry signal received from a remote control system not disposed on the FBW aircraft or from a preprogrammed trajectory. The plurality of simulated pilot control signals are configured to direct the FBW aircraft to perform an aircraft maneuver in accordance with the at least one aircraft maneuver command.

In another aspect, the present invention is directed to a control system for use on a fly-by-wire (FBW) aircraft. The system includes a sensor module configured to obtain aircraft flight parameters from the FBW aircraft. A maneuver module is configured to generate at least one reference parameter value from at least one aircraft maneuver command. The at least one aircraft maneuver command is derived from at least one command telemetry signal received from a remote control system not disposed on the FBW aircraft. A control module is coupled to the sensor module and the maneuver module. The control module is configured to generate a correction signal as a function of the aircraft flight parameters and the at least one aircraft maneuver command. A command module is coupled to the control module. The command module is configured to generate simulated pilot control signals based on the correction signal. The simulated pilot control signals is configured to direct the FBW aircraft to perform an aircraft maneuver in accordance with the at least one aircraft maneuver command.

In yet another aspect, the present invention is directed to a method for converting a man-rated fly-by-wire aircraft into a remote controlled unmanned airborne vehicle (UAV). The method includes the step of providing an embedded controller configured to generate a plurality of simulated pilot control signals from at least one aircraft maneuver command. The plurality of simulated pilot control signals are generated in accordance with a predetermined control law. The at least one aircraft maneuver command is derived from at least one command telemetry signal received from a remote control system not disposed on the FBW aircraft or a pre-programmed trajectory. The plurality of simulated pilot control signals are configured to direct the FBW aircraft to perform an aircraft maneuver in accordance with the at least one aircraft maneuver command. The method further includes the step of decoupling existing pilot controls from a fly-by-wire flight control system (FBW-FCS) disposed on the aircraft. The FBW-FCS is configured to control aircraft control surfaces disposed on the aircraft. Next, the embedded controller is connected to the FBW-FCS and replaces the existing pilot controls.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 2 is a schematic diagram illustrating the disposition of outer loop control processor (OLCP) within the UAV;

FIG. 5 is a diagram illustrating the OLCP control system architecture in accordance with the present invention.

DETAILED DESCRIPTION

Figure 1:
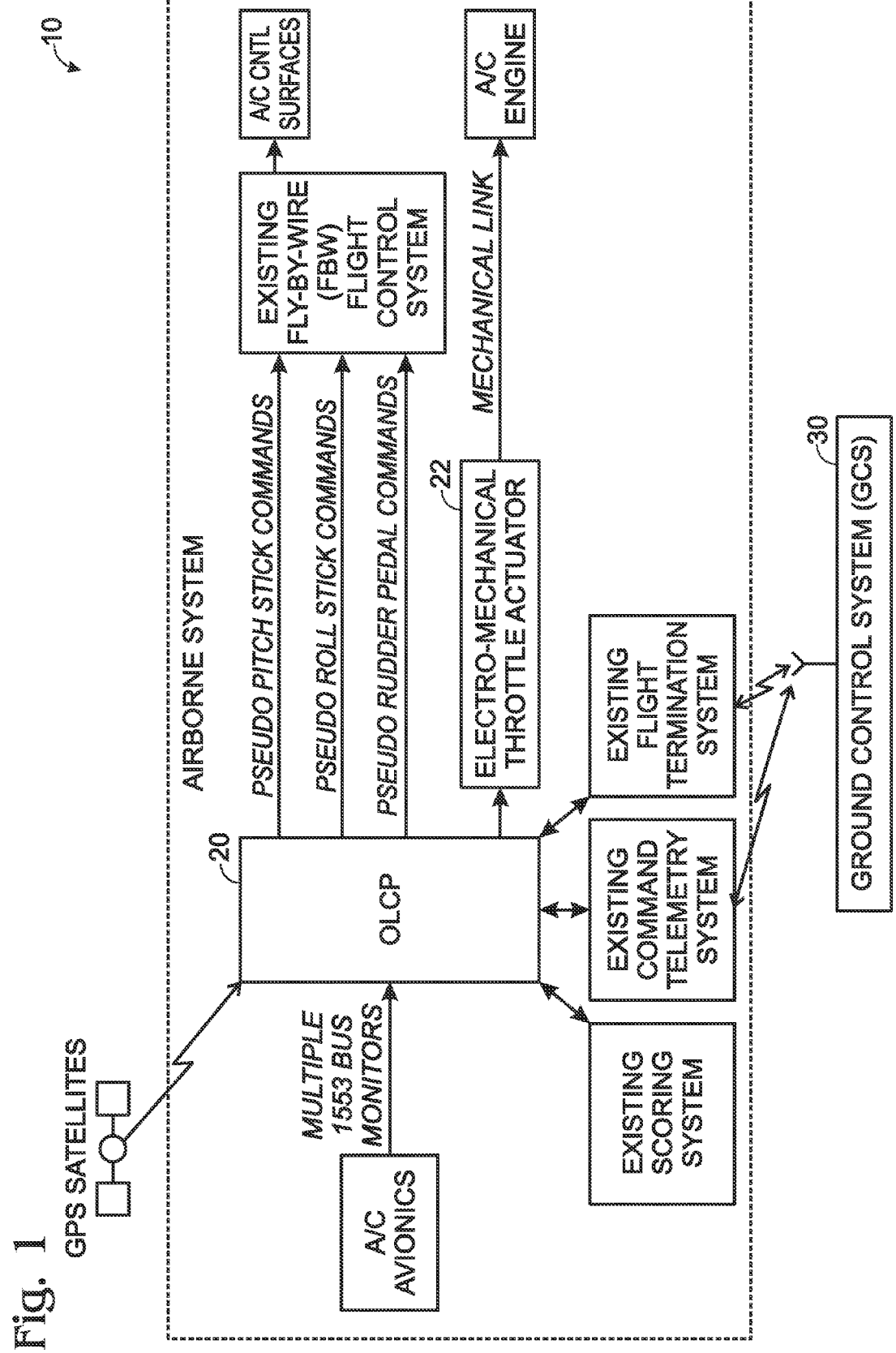
FIG. 1 is a block diagram of an airborne control system in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the system of the present invention is shown in FIG. 1, and is designated generally throughout by reference numeral 10.

As embodied herein, and depicted in FIG. 1, a block diagram of a UAV control system 10 in accordance with one embodiment of the present invention is disclosed. The system 10 includes an outer loop control platform (OLCP) 20 disposed on an airborne platform, and a ground control system (GCS) 30. Those of ordinary skill in the art will understand that GCS 30 may also be implemented on an airborne platform depending on mission requirements.

Although not shown in FIG. 1, GCS 30 typically includes communications and telemetry systems that are adapted to communicate with the communications and telemetry systems disposed aboard the aircraft. The GCS telemetry system is coupled to a processing system that is programmed to format GCS operator commands in accordance with both the telemetry system requirements and the aircraft requirements. The processing system is coupled to an operator I/O system and an operator display.

In one embodiment, the operator I/O provides the processor with input control signals that are substantially identical to the signals generated by cockpit control devices, such as the pitch/roll sticks, pedals, engine thrust control, etc., that are disposed in the aircraft. For example, if the UAV is a converted F-16 fighter aircraft, the processor in GCS 30 is programmed to provide GCS 30 telemetry/communication system with compatible signals. These commands are provided to the communication/telemetry systems 32 and transmitted to OLCP 20. This is described herein as the "joystick" method.

In another embodiment, the GCS 30 operator I/O provides the operator with various maneuver options, such as turn, roll, etc. Of course, this GCS implementation is much easier to implement. In fact, the operator may transmit maneuver commands to the GCS command telemetry system via a personal computer or a laptop computer. The maneuver commands are transmitted to the UAV command telemetry unit, and OLCP 20 translates the maneuver commands appropriately.

In yet another embodiment, OLCP 20 maneuvers in accordance with a preprogrammed flight trajectory. For example, OLCP 20 programming may direct the FBW aircraft to follow and repeat a certain flight path at a predetermined airspeed and altitude. In this case, GCS 30 does not have to provide moment-to-moment control of the UAV. However, GCS 30 may reprogram OLCP 20 by way of the command telemetry uplink and direct OLCP 20 to follow a new trajectory. This feature of the present invention may be very beneficial during surveillance missions or weapons delivery missions.

Regardless of the type of GCS 30 employed to control the UAV, OLCP 20 processes these commands on a real-time basis to fly the aircraft, i.e., use the existing fly-by-wire flight control system, avionics, and other existing aircraft systems in accordance with operator commands. OLCP 20 provides the existing fly-by-wire flight control system (FBW-FCS) with pseudo pitch stick commands, roll stick commands, and rudder pedal commands in accordance with GCS 30 instructions.

The present invention also includes an electro-mechanical throttle actuator 22 that is electrically coupled to OLCP 20. Throttle actuator 22 is disposed and mounted in the cockpit, and mechanically coupled to the existing aircraft throttle. Throttle actuator 22 receives scaled and calibrated servo control signals from OLCP 20 and physically manipulates the existing throttle mechanism in response thereto.

OLCP 20 may also be equipped, coupled to, or used in conjunction with, with one or more digital cameras 24. Digital cameras 24 may be disposed within the aircraft canopy to obtain a "cockpit view" of the UAV. OLCP 20 transmits aircraft navigational data, altitude, aircraft attitude data, and digital video (when so equipped) to GBCS 30. This information may be displayed on a GCS 30 display for the benefit of the operator/pilot that is "flying" the UAV via GCS 30.

FIG. 2 is a schematic diagram that illustrates the disposition of OLCP 20 within the UAV. Before the aircraft is converted into a UAV, the existing FBW-FCS is coupled to the existing pilot controls by way of redundant electrical interfaces. The present invention takes advantage of this arrangement by decoupling the cockpit pilot controls from the FBW-FCS, and replacing them with OLCP 20. OLCP 20 is also electrically coupled to existing aircraft landing gear interfaces, communications and telemetry interfaces, and existing avionics. OLCP 20 may also be coupled to a flight termination system and a scoring system developed for existing drone systems. OLCP 20 is configured to transmit and receive both analog and digital data in accordance with the existing electrical interfaces deployed in the aircraft. Once OLCP 20 is programmed and configured for deployment on a given fly-by-wire airborne platform, it is easily installed by connecting OLCP 20 to existing aircraft systems by way of signal cable interfaces 26. OLCP 20 may be coupled to existing avionics by way of redundant high speed serial data bus interfaces 28. As noted previously, OLCP 20 is coupled to the existing throttle via an electro-mechanical actuator 22.

Although a single OLCP 20 is shown in FIG. 2, the present invention typically employs multiple-redundant systems for safety and reliability. Those skilled in the art will understand that redundant systems may be implemented by using a single OLCP that includes multiple processing channels or multiple OLCPs 20, each having a single processing channel. When redundant systems are employed, the system includes a voting algorithm that selects an appropriate channel output.

Figure 3:
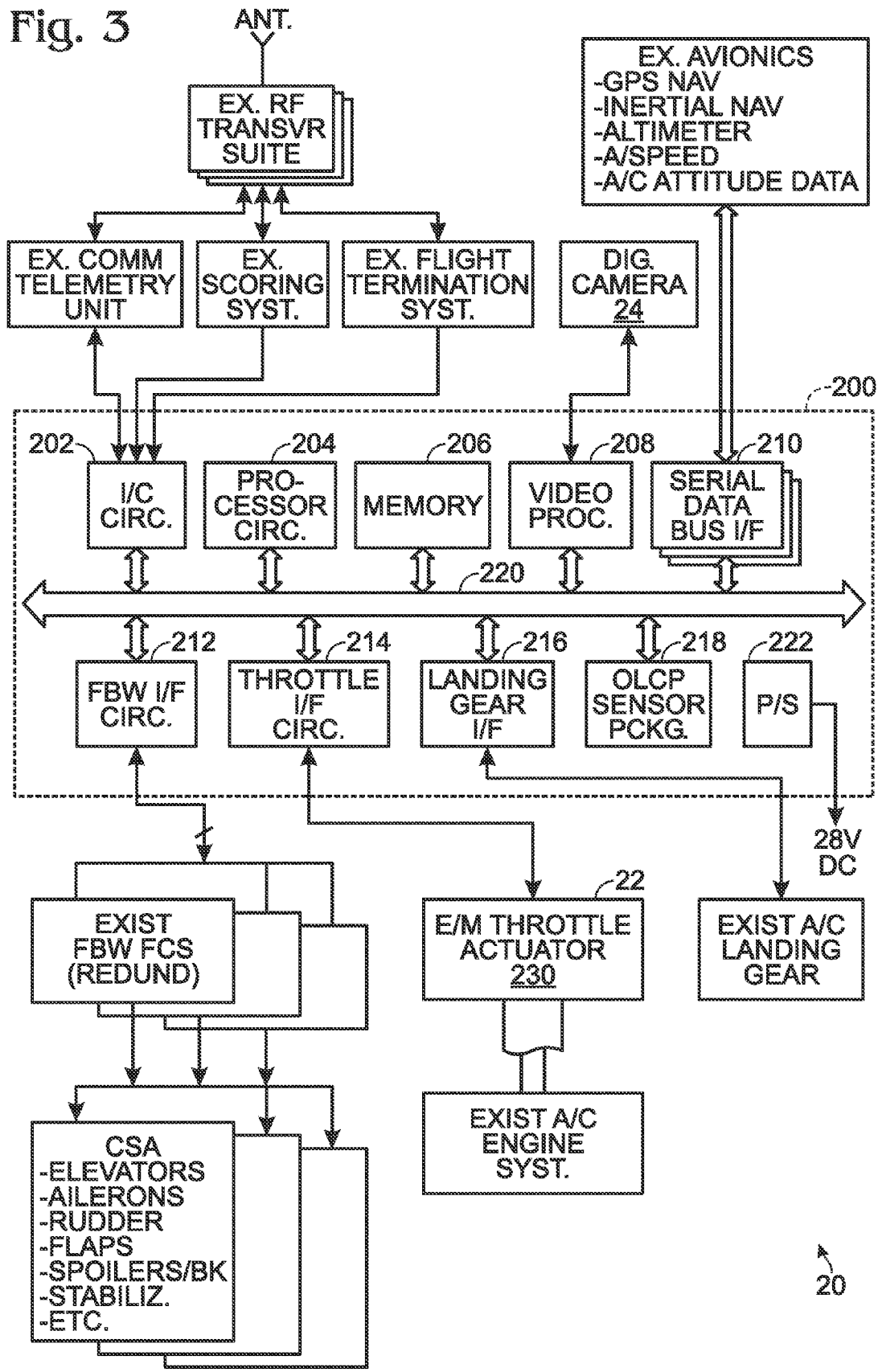
FIG. 3 is a perspective view of the OLCP enclosure in accordance with the present invention.

As embodied herein and depicted in FIG. 3, a simplified hardware block diagram of the OLCP 20 in accordance with one embodiment of the present invention is disclosed. Again, OLCP 20 typically includes redundant processing channels for reliability and safety reasons. FIG. 3 shows a single channel embodiment for clarity of illustration.

OLCS 20 is implemented as an embedded processor system 200 that includes I/O circuits 202, embedded processor 204, memory 206, high speed serial data bus interface (I/F) circuits 210, fly-by-wire interface (FBW I/F) circuits 212, throttle interface circuit 214, landing gear interface 216, and OLCP sensor package 218 coupled to bus 220. System 200 also includes power supply 222. System 200 is also shown to include video processor circuit 208. The video processor is configured to process the data provided by digital camera 24. On the other hand, those of ordinary skill in the art will understand that the video system may be implemented using an existing video system and be deployed in the UAV as a separate stand-alone unit.

Further, any suitable communications/telemetry unit, scoring system, and flight termination equipments may be employed by the present invention. The command telemetry system may be implemented with off-the-shelf equipment developed for existing drone systems or custom designed equipment, depending on the UAV implementation. As those skilled in the relevant arts will understand, the communications and telemetry equipment employs a high speed radio link having the signal bandwidth to support OLCP 20 functionality. In any event, the design and implementation of I/O circuitry 202 is a function of the command telemetry system disposed on the aircraft and is considered to be within the abilities of one of ordinary skill in the art.

In one embodiment, processor 204 is implemented using a PowerPC. However, as those of ordinary skill in the art will appreciate, processor 204 may be of any suitable type depending on the timing and the sizing requirements of the present invention. Accordingly, processor 204 may be implementing using an X86 processor, for example, or by DSP devices manufactured by Freescale, Analog Devices, Texas Instruments, as well as other suitable DSP device manufacturers. The processor 204 may be implemented using application specific integrated circuits (ASIC) and/or field programmable gate array (FPGA) devices as well. Combinations of these devices may also be used to implement processor 204.

Memory 206 may include any suitable type of computer-readable media such as random access memory (RAM), flash memory, and various types of read only memory (ROM). The term "computer-readable media" as used herein refers to any medium that may be used to store data and computer-executable instructions. Computer readable media may be implemented in many different forms, including but not limited to non-volatile media, volatile media, and/or transmission media. As those of ordinary skill in the art will understand, RAM or DRAM may be used as the "main memory," and employed to store system data, digital audio, sensor data, status information, instructions for execution by the processor, and temporary variables or other intermediate data used by the processor 204 while executing instructions.

Memory 206 may employ non-volatile memory such as flash memory or ROM as system firmware. Flash memory is also advantageous for in-flight reprogramming operations. In this instance, GCS 30 may provide OLCP with programmed trajectory data that supersedes previously stored trajectory data. Static data, start-up code, the real-time operating system and system applications software are embedded in these memory chips. Of course, non-volatile memory does not require power to maintain data storage on the memory chip. Flash memory is physically rugged and is characterized by fast read access times. ROM may be implemented using PROM, EPROM, E$^2$PROM, FLASH-EPROM and/or any other suitable static storage device.

Those of ordinary skill in the art will understand that the present invention may also be implemented using other forms of computer-readable media including floppy-disks, flexible disks, hard disks, magnetic tape or any other type of magnetic media, CD-ROM, CDRW, DVD, as well as other forms of optical media such as punch cards, paper tape, optical mark sheets, or any other physical medium with hole patterns or other optically recognizable media. The present invention also defines carrier waves or any other media from which a computer may access data and instructions, as computer-readable media.

Embedded system 200 also includes high speed serial data bus interface circuitry 210. The high speed serial data bus interfaces are configured to transmit and receive information to and from the existing avionics systems disposed on the aircraft. These existing systems may include GPS Navigation systems, inertial navigation systems, and sensor systems that provide altimeter, airspeed, and aircraft attitude (i.e., pitch, roll, yaw, and etc.) data. Those of ordinary skill in the art will understand that high speed serial data bus defines the electrical, mechanical, and functional characteristics of the bus system. The present invention may employ any suitable high speed data bus interface such as MIL-STD-1553, IEEE-1394, ARINC-429, ARINC-629, RS-485, RS-422, and RS-232. Those of ordinary kill in the art will also understand that the present invention should not be construed as being limited by the foregoing examples. For example, the high speed serial data bus interface employs a differential interface that supports up to thirty-two interface devices on the bus. The bus is asynchronous and uses a half-duplex format. Data is transmitted using Manchester encoding.

Turning to the fly-by-wire interface (FBW I/F) circuit 212, note that in a man-rated FBW aircraft, the pilot stick and rudder controls are coupled to control transducers that are configured to generate pilot control transducer signals. As the pilot actuates the cockpit control devices (control stick, wheel, pedals, etc.), transducer signals that are proportional to the position of the control device are generated. One common means for measuring such displacements is a linear variable differential transformer (LVDT) sensor. When rotational angles are measured, rotary variable differential transformer (RVDT) sensors may be employed. Accordingly, the FBW I/F circuit 212 includes a bus 220 interface that receives digital commands from the processor circuit 204. These digital signals are converted into analog signals that simulate LVDT or RVDT sensor outputs. The LVDT and/or RDVT simulated output signals are directed to the existing FBW-FCS. The existing FBW-FCS cannot tell the difference between the pilot controls and the simulated signals, and functions as before, driving the various control surface actuators (CSA) disposed on the airplane to cause the elevators, ailerons, rudder, flaps, spoilers, stabilizers, slats, flaperons, elevons, ruddervators, thrust vectoring nozzles, and/or other such control surfaces to move in accordance with the digital commands from the processor circuit 204. Of course, the digital commands generated by processor circuit 204 are ultimately provided by GCS 30 via the existing command telemetry system. Those of ordinary skill in the art will understand that the present invention should not be construed as being limited to any particular type of aircraft. Obviously, the number and type of control surfaces is a function of aircraft type (F-16, F-18, Airbus, B2, F-22, F-106, F-117, etc.). Any FBW aircraft may be converted into a UAV in accordance with the principles of the present invention.

The existing aircraft throttle control must be physically manipulated. Thus, throttle interface circuit 214 is configured to provide electro-mechanical (E/M) actuator 22 with servo-control signals that correspond to the throttle commands provided by GCS 30. Any suitable linear E/M actuator, such as a ball screw actuator, may be employed to implement E/M actuator 22.

Embedded system 200 also includes a landing gear interface circuit 216. The implementation of circuit 216 is largely dependent on the landing gear employed by the FBW aircraft. The details of implementing a landing gear interface circuit that provides appropriate signaling to an existing landing gear system is deemed to be within the skill of one of ordinary skill in the art.

System 200 may also include an optional sensor package 218 that is configured to augment the aircraft's existing sensor systems. Certain older FBW aircraft have analog sensors that are not accommodated by the high speed serial data bus. For example, older F-16 aircraft may be equipped with analog altimeter and airspeed sensors. OLCP 20 requires the aircraft's heading, roll, pitch, normal acceleration, pressure altitude, true velocity, roll rate, and other such sensor inputs to generate the stick, rudder, and throttle commands that are used to fly the UAV.

Finally, embedded system 200 includes a power supply 222. The power supply 222 includes various DC/DC converters that are configured to convert +28 VDC voltages into the voltages required by PLCP 20.

Figure 4:
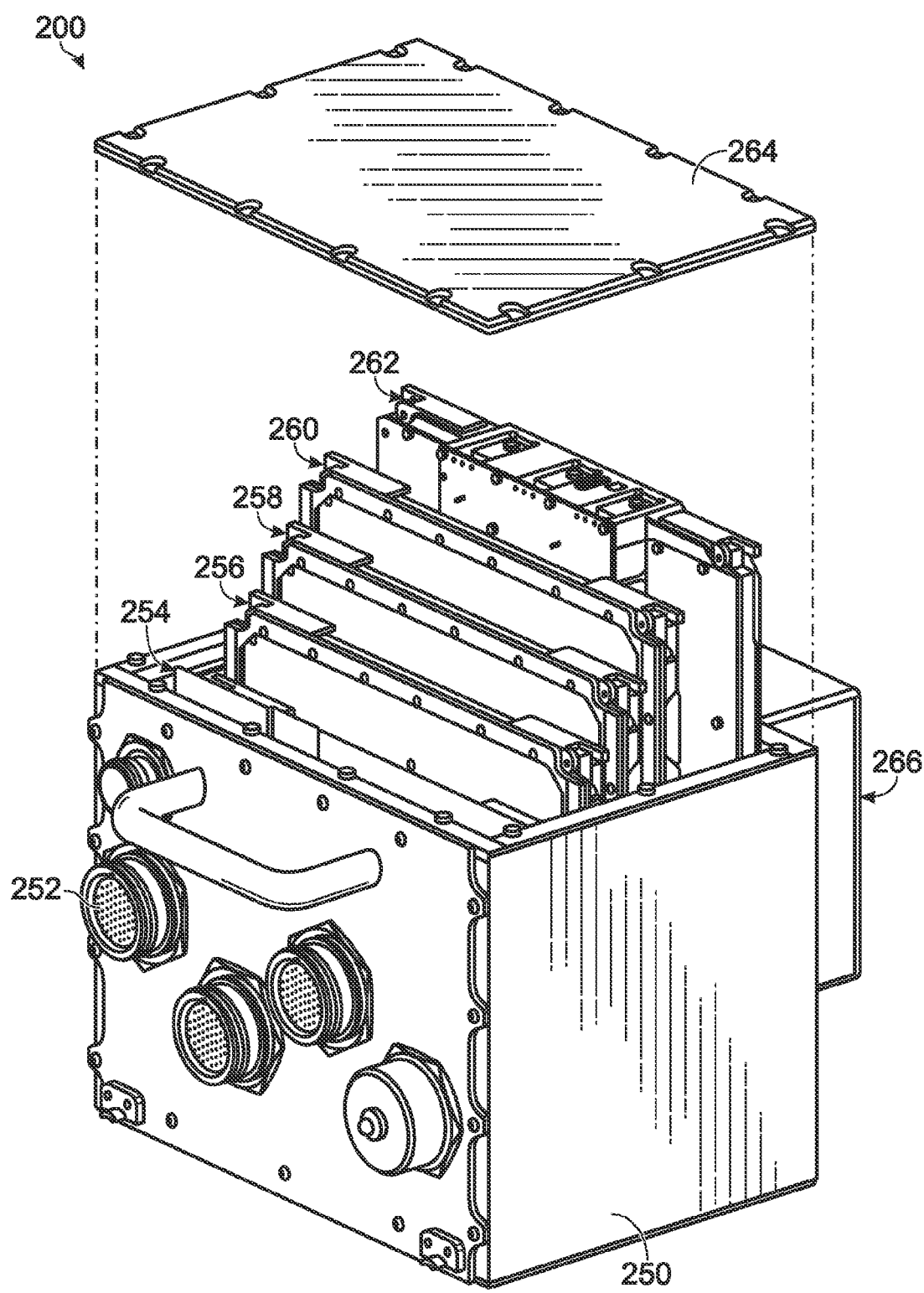
FIG. 4 is a hardware block diagram of the OLCP in accordance with an embodiment of the present invention.

Referring to FIG. 4, a perspective view of OLCP 20 in accordance with one embodiment of the present invention is disclosed. As described above, OLCP 20 may be implemented as an embedded electronic control system 200. The embedded system is environmentally sealed and protected within a rugged enclosure 250, engineered to withstand the environmental forces applied during flight. In the embodiment depicted in FIG. 4, enclosure 250 may be implemented using a ruggedized Airline Transport Rack (ATR) that supports a VME (Versa Modular European) bus format. The front side of enclosure 250 includes a plurality of connectors 252. The connectors 252, of course, mate with connectors disposed on the cables 26 that connect OLCP 20 with the existing aircraft systems. Connectors 252 are electrically coupled to I/O plane 254 and provides a means for coupling the redundant VME control channel boards (256, 258, 260) to connectors 252.

As those of ordinary skill in the art will understand, the VME bus is a flexible, memory mapped bus system that recognizes each system device as an address, or a block of addresses. The VME bus supports a data transfer rate of approximately 20 Mbytes per second. The VME bus is a "TTL" based backplane that requires +5 VDC as well as ±12 DC. Accordingly, power supply 262 converts +28V DC from the aircraft power bus into +5 VDC and ±12 VDC power.

The size of the ATR rack 250 depends on how system redundancy is achieved. In the embodiment depicted herein, each VME board (256, 258, 260) implements a control channel and includes a special purpose processor, various interface circuits, and a power supply. On the other hand, if each ATR rack accommodates one processing channel, several smaller ATR racks may be daisy-chained together to achieve redundancy.

As those of ordinary skill in the art appreciate, electrical and electronic components generate thermal energy that must be conducted away from the electronic components. As such, the thermal design, including various heat sinking devices and the like, directs the thermal energy to fan unit 266 disposed at the rear portion of the enclosure 250. The fan unit 266 expels the heated air mass into the surrounding space where it dissipates without causing damage to the electronic components.

As embodied herein and depicted in FIG. 5, a diagram illustrating the OLCP software control system architecture 50 in accordance with the present invention is disclosed. The OLCP control system architecture includes a sensor module 52 and a maneuver module 54 coupled to control module 56. The output of the control module 56 is coupled to the command module 58. As described in the hardware description, software modules 52-58 are implemented in firmware and executed by processor 204.

The OLCP 20 inputs sensor measurements and maneuver type commands. The sensor measurements may be obtained by way of the high speed serial data bus interface 210 or OLCP sensor package 218 and are pre-conditioned with appropriate scaling. As noted previously, OLCP 20 provides the existing aircraft systems with the pitch stick commands, roll stick commands, and rudder pedal commands in a form that is identical to the LVDT and the RVDT sensors that generate the pilot control transducer signals in a man-rated aircraft. Again, the pitch and roll stick and rudder pedal command signals replace the normal pilot's stick and rudder pedal input signals. OLCP 20 also generates the throttle servo position commands in a form compatible with electro-mechanical actuator 22. Linear E/M actuator 22 moves the throttle lever in accordance with the throttle servo position commands to control engine thrust.

Sensor Module 52 mainly is used to convert discontinuous signals such as heading, pitch, and roll angle into continuous signals. The sensor inputs include pitch, roll, heading, normal acceleration, pressure altitude, true velocity, roll rate, etc. Those of ordinary skill in the art will understand that certain sensor measurements such as heading, for example, are provided as discrete values, i.e., 0°-360°. Sensor module 52 "unwraps" the discrete signal measurements and provides the Control Module 56 with continuous measurements with no discrete discontinuities. The sensor module 52 also performs trigger holding of appropriate sensors in accordance with Control Module 56 requirements, when a maneuver type is commanded. Of course, the sensor module also conditions the sensor data received from the high speed serial data bus interface.

GCS 30 may transmit maneuvers to OLCP 20 via the "joystick" method or by way of the maneuver command method. OLCP 20 may also be preprogrammed to follow a predetermined trajectory. Maneuver module 54 is programmed to decipher each type of command and provide control module 56 with "discrete flag counts" and the appropriate reference signals for maneuver types. The discrete flag counts correspond to a maneuver type. Examples of the reference signals include velocity, heading, and altitude reference signals.

In the "joystick" method, GCS 30 input controls are substantially identical to the cockpit control devices disposed on a man-rated aircraft, such as the pitch/roll sticks, pedals, engine thrust control, etc. As the ground based operator manipulates the pitch stick, roll stick, and rudder pedals provided in the GCS simulator, GCS 30 generates the electrical signals corresponding to the operator/pilot commands. These commands are provided to the communication/telemetry systems 32 and transmitted to OLCP 20. Maneuver module 54 processes these commands on a real-time basis.

When GCS 30 employs the maneuver command format, a suite of aircraft maneuvers are available to the ground based GCS operator for input. For example, the operator may select a "2 g turn to the right, hold altitude" command. GCS 30 may use this mode to provide simple autopilot commands, such as "fly at 300 knots at a heading of 270°, at an altitude of 20,000 feet." The maneuver module 54 responds by generating the discrete flag count and the reference signals corresponding to the maneuver command.

In the embodiment wherein OLCP 20 is preprogrammed, processor 204 follows the trajectory instructions stored in firmware memory 206. Thus, maneuver module receives the reference maneuver command internally, rather than from GCS 30.

As those of ordinary skill in the art will appreciate, the discrete flag count may be stored in a look-up table as a function of the maneuver command. Discrete reference signals may also be stored therein. Maneuver module 54 may be configured to extrapolate between the discrete reference values stored in the table to limit the table size. However, the maneuver module 54 should not be construed as being limited to the table embodiment discussed above. In any event, the Maneuver Module 54 is configured to decipher numerical GCS commands and generate appropriate discrete flags for Control Module 56.

Control Module 56 is programmed to convert the sensor module input and the maneuver module input into a "control law" for each maneuver type. Several types of control laws may be implemented within the Control Module 56 to perform each maneuver type. Each control law is determined by an error-loop type architecture implemented by a Proportional Integral Differential (PID) control law. PID control employs a continuous feedback loop that regulates the controlled system by taking corrective actions in response to any deviation from the desired values (i.e., the reference signals from the maneuver module—velocity, heading, altitude, and other such values). Deviations are generated when the GCS 30 operator changes the desired value or aircraft experiences an event or disturbance, such as wind or turbulence, that results in a change in measured aircraft parameters. The PID controller 56 receives signals from the sensors and computes the error signal (proportional/gain), the sum of all previous errors (integral) and the rate of change of the error (derivative).

The gains for the PID control laws are determined prior to the implementation of the code and are typically schedule-based static pressure and dynamic pressure measurements. For a FBW aircraft such as the F-16, with the landing gear retracted, the measurements and the predetermined gain values are related to the desired normal acceleration and roll rate commands. Accordingly, Control Module 56 provides the command module 58 with desired longitudinal acceleration (throttle control), normal acceleration, and roll rate reference signal to the Command Module 58.

The Command Module 58 converts the output of the error-loop command control law to signals that replace the FBW aircraft's stick, rudder and throttle servo. Four commands are output: pitch stick, roll stick, rudder pedal commands and a throttle servo position command. The Command Module 58 consists of a reverse breakout routine to overcome the hardware/software breakout which is present on the pitch, roll and rudder command paths. The routine adds the breakout value if the Control Module control command signal is within the breakout limits of the breakout function. When the Control Module control command signal is above the pitch and roll breakout value the command is allowed to pass through directly to the pitch and roll stick summing point. The FBW aircraft's control law will also contain a stick gradient function converting stick measurements to normal acceleration command signals for the pitch flight control system and roll rate command signals for the lateral/directional flight control system. The Control Module 56 is designed to command normal acceleration and roll rate. Therefore, an additional algorithm within the Command Module 56 is required to provide a "reverse" stick gradient function for the Control Module 58 outputs. A table lookup routine may be used to interpolate between the discrete points determined from the optimization routine creating a continuous output signal.

Figure 6:
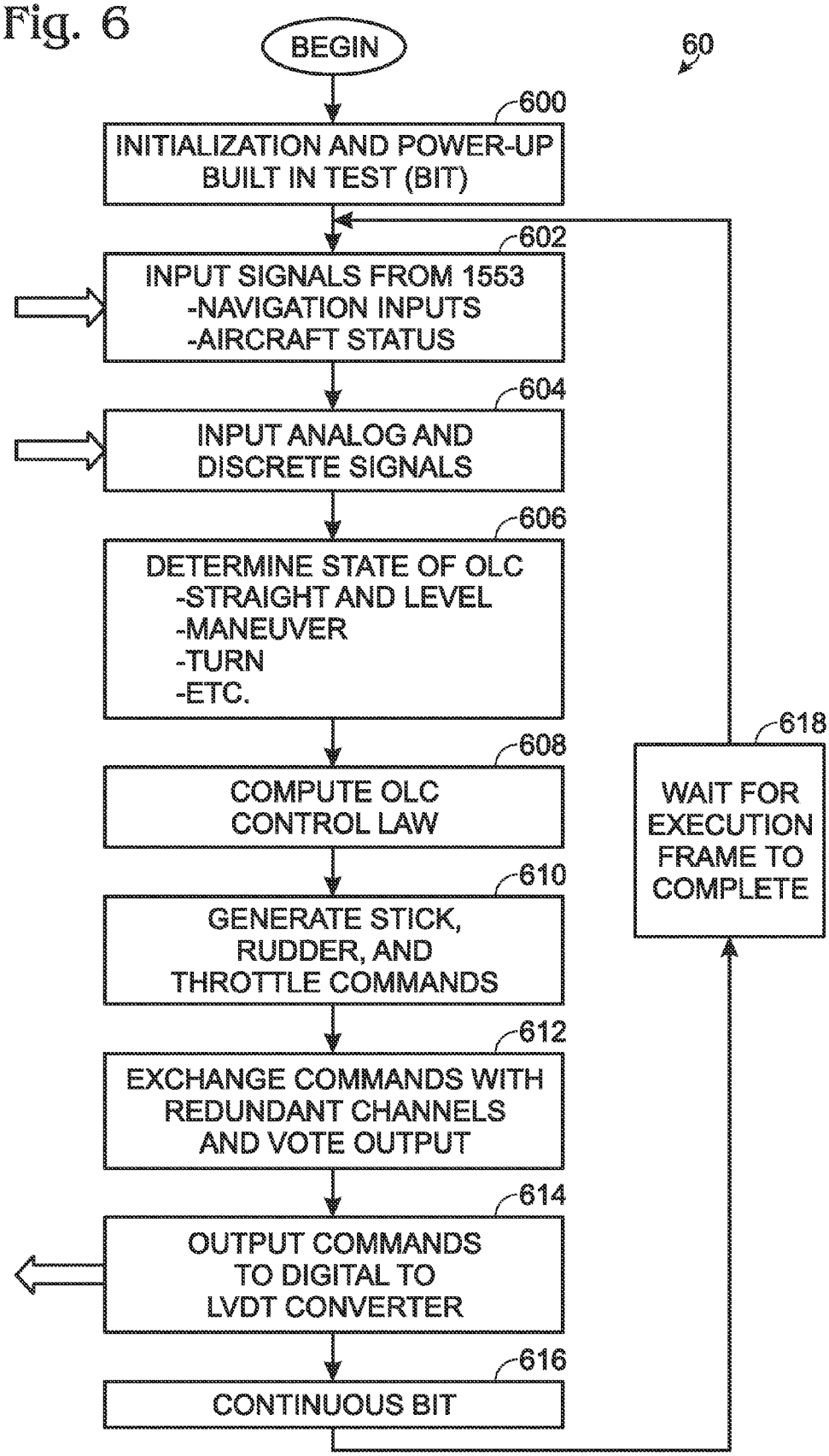
FIG. 6 is a flow chart illustrating the software control of the OLCP.

Referring to FIG. 6, a flow chart illustrating the software control of the OLCP is disclosed. The control loop is implemented by scheduling events within a predetermined timing frame 60 that is continuously repeated. In one embodiment of the present invention, the frame rate is substantially equal to 64 Hz. Therefore, the software calls each scheduled event once every 15.625 milliseconds. For reliability and extensibility reasons, i.e., the ability to add new functionality as mission requirements change and grow, the frame rate includes a 50-100% execution margin depending on the implementation. Those of ordinary skill in the art will understand that the frame rate may be any suitable rate consistent with the aircraft's maneuvering and stability requirements. For example, the F-18 may require an 80 Hz frame rate.

In step 600, processor 204 performs initialization and built-in testing. As those of ordinary skill in the art will appreciate, each processing channel in OLCP 20 must perform a self-test to ensure system reliability. The processor, RAM, and firmware are tested to ensure that these circuits are operating properly. The processor may be required to perform certain predetermined computations to ensure computational reliability. Memory may be checked by determining whether various memory locations may be accessed. The BIT tests may test each of the interface circuits to determine whether these circuits are able to read and write to the existing aircraft systems. The self-tests also test the power supply 222 to ensure that aircraft input power (+28 VDC), and measure the output of the various power rails (+5 VDC, ±12 VDC, etc.). The self-tests may also perform communication tests to ensure that OLCP 20 is able to communicate to GCS 30 via the aircraft command telemetry unit. After step 600 is completed, embedded processor 204 begins continuous execution of the control loop.

In step 602, processor 204 obtains the various avionics signals from the high speed serial data bus interface. These signals typically include navigation and aircraft status inputs. In step 604, discrete signals and various analog signals are also obtained. An example of a discrete signal is the landing gear status. In older FBW aircraft, certain parameters such as dynamic pressure (airspeed) and static pressure (altitude) may not be available on the high speed serial data bus. These parameters may be provided by analog sensors. Both of these steps are performed by calling the sensor module 52.

At this point in the frame (step 606), the maneuver module 54 determines the state of the OLCP 20. As noted previously, GCS 30 commands may be provided by GCS 30 in either the "joystick" mode or the "maneuver command" mode, or the state of OLCP 20 may be provided by a preprogrammed trajectory stored in firmware. For example, GCS 30 may order the UAV to proceed on a straight and level path, perform a barrel roll, perform a turn, or any other such maneuver. As described above, maneuver module 54 responds by generating the appropriate discrete flag count and reference signals corresponding to the maneuver command. Those of ordinary skill in the art will also understand that the desired state of OLCP 20 may include actuation of weapons delivery systems when the UAV is configured as a combat air vehicle (CAV).

In step 608, processor 204 calls the control module 56 to compute the OLCP 20 control law. Again, the control law is determined by an error-loop type architecture implemented by a Proportional Integral Differential (PID) control law.

Subsequently, in step 610, Command Module 58 converts the output of the error-loop command control law into pitch stick, roll stick, rudder pedal, and throttle servo position commands.

At this point in the discussion it is important to recall that OLCP 20 is implemented with redundant processing channels. If OLCP employs three redundant channels, the activities of the sensor module, the maneuver module, the control module, and the command module are performed in parallel by three machines. In step 612, the channel commands for the frame are exchanged and a voting algorithm is performed. In one embodiment of the present invention, all of the channel outputs are compared to a failure threshold. If a given channel exceeds the threshold, its result is thrown out. Thus, the remaining two channels are averaged. In another embodiment, the high and low value may be disregarded and the middle value selected. Alternatively, in a two channel system, both values may be averaged. In a four channel system, the voting algorithm may be configured to throw out the high and low values for each parameter and average the middle values. Those of ordinary skill in the art will understand that the present invention may be implemented using any reasonable voting algorithm.

In step 614, processor 204 writes the pitch stick, roll stick, rudder pedal output commands to FBW I/F circuit 212 (See FIG. 3) which converts these values into simulated LVDT/RVDT signals for use by the existing FBW-FCS on board the aircraft. Similarly, processor 204 provides a throttle position command to the throttle I/F circuit 214. Throttle I/F circuit 214 transmits a throttle servo position command to the E/M actuator 230 in response thereto.

At this point in frame 60, continuous BIT testing is performed. Continuous BIT (step 616) may be implemented as sub-set of the tests performed in step 600. This testing provides in flight redundancy management and tests each processing channel on a frame-by-frame basis.

Finally, processor 204 enters an idle state and waits for the remainder of the 15.625 millisecond frame to complete. As noted above, frame 60 may include a margin of 50%-100%. In the latter case, processor 204 may be idle for 7.8125 milliseconds before repeating steps 602-618 in the next frame sequence.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A control system for use on a fly-by-wire (FBW) aircraft, the system comprising:
    a controller coupled to the FBW aircraft, the controller being configured to generate a plurality of simulated pilot control signals from at least one aircraft maneuver command, the plurality of simulated pilot control signals being generated in accordance with a predetermined control law, the at least one aircraft maneuver command being derived from at least one command telemetry signal received from a remote control system not disposed on the FBW aircraft or from a pre-programmed trajectory, the plurality of simulated pilot control signals being configured to direct the FBW aircraft to perform an aircraft maneuver in accordance with the at least one aircraft maneuver command.

2. The system of claim 1, wherein the remote control system is a ground based control system.

3. The system of claim 1, wherein the remote control system is an airborne control system.

4. The system of claim 1, further comprising at least one interface circuit coupled between the controller and a fly-by-wire flight control system (FBW-FCS) configured to control the FBW aircraft control surfaces, the at least one interface circuit being configured to derive simulated pitch stick signals, simulated roll stick signals, and simulated rudder pedal signals from the simulated pilot control signals in accordance with FBW-FCS signal requirements.

5. The system of claim 1, further comprising:
    a throttle interface circuit coupled to the controller, the throttle interface being configured to derive throttle servo commands from the simulated pilot control signals; and
    an electro-mechanical throttle actuator coupled between the throttle interface circuit and an aircraft throttle, the electro-mechanical throttle actuator being configured to move the aircraft throttle in accordance with the throttle servo commands.

6. The system of claim 1, wherein the plurality of simulated pilot control signals include simulated pitch stick commands, roll stick commands, and rudder pedal commands.

7. The system of claim 1, further comprising at least one sensor interface circuit coupled to the controller, the at least one sensor interface circuit being configured to obtain measured sensor parameters.

8. The system of claim 7, wherein the predetermined control law generates the plurality of simulated pilot control signals by determining an error signal, the error signal being a function of the measured sensor parameters and the at least one aircraft maneuver command.

9. The system of claim 8, wherein the controller is programmed to perform a Proportional Integral Differential (PID) control algorithm to implement the predetermined control law.

10. The system of claim 7, wherein the at least one sensor interface circuit includes a high serial data bus coupled to the controller.

11. The system of claim 1, further comprising a landing gear interface circuit coupled to the FBW aircraft.

12. The system of claim 1, wherein the controller is configured to periodically generate the plurality of simulated pilot control signals in accordance with a predetermined frame rate.

13. The system of claim 12, wherein the predetermined frame rate is substantially equal to 64 Hz.

14. The system of claim 1, wherein the at least one aircraft maneuver command is based on pseudo pitch stick, pseudo roll stick, and pseudo rudder pedal signals generated by a flight simulator device disposed at the remote control system.

15. The system of claim 1, wherein the at least one aircraft maneuver command is based on a maneuver command signal generated by the remote control system.

16. The system of claim 1, wherein the control system is an embedded processor system configured to replace existing pilot stick controls and existing pilot rudder controls coupled to the FBW aircraft flight control system.

17. The system of claim 1, wherein the existing pilot stick controls and existing pilot rudder controls are configured to generate a plurality of pilot control signals having predetermined signal characteristics, the plurality of simulated pilot control signals having signal characteristics substantially identical to the predetermined signal characteristics.

18. A control system for use on a fly-by-wire (FBW) aircraft, the system comprising:
a sensor module configured to obtain aircraft flight parameters from the FBW aircraft;
a maneuver module configured to generate at least one reference parameter value from at least one aircraft maneuver command, the at least one aircraft maneuver command being derived from at least one command telemetry signal received from a remote control system not disposed on the FBW aircraft;
a control module coupled to the sensor module and the maneuver module, the control module being configured to generate a correction signal as a function of the aircraft flight parameters and the at least one aircraft maneuver command; and
a command module coupled to the control module, the command module being configured to generate simulated pilot control signals based on the correction signal, the simulated pilot control signals being configured to direct the FBW aircraft to perform an aircraft maneuver in accordance with the at least one aircraft maneuver command.

19. The system of claim 18, wherein the aircraft flight parameters are selected from a group of aircraft sensor parameters including aircraft heading, pitch, yaw, roll angle, altitude, dynamic air pressure, and/or static air pressure.

20. The system of claim 18, wherein the at least one aircraft maneuver command is based on pseudo pitch stick, pseudo roll stick, and pseudo rudder pedal signals generated by a flight simulator device disposed at the remote control system.

21. The system of claim 18, wherein the at least one aircraft maneuver command is based on a maneuver command signal generated by the remote control system.

22. The system of claim 18, wherein the correction signal is an error signal computed in accordance with a predetermined control law.

23. The system of claim 22, wherein the predetermined control law is implemented by an Proportional Integral Differential (PID) control algorithm.

24. The system of claim 18, further comprising at least one interface circuit coupled between the command module and the FBW flight control system (FBW-FCS), the at least one interface circuit being configured to derive simulated pitch stick signals, simulated roll stick signals, and simulated rudder pedal signals from the simulated pilot control signals in accordance with FBW-FCS signal requirements, the FBW-FCS being configured to control aircraft control surfaces.

25. The system of claim 18, wherein the sensor module, the maneuver module, the control module, and the command module are at least partially implemented as a computer-readable medium having computer-executable instructions stored thereon and at least one processing circuit configured to execute the computer-executable instructions.

26. A method for converting a man-rated fly-by-wire aircraft into a remote controlled unmanned airborne vehicle (UAV), the method comprising:
providing an embedded controller configured to generate a plurality of simulated pilot control signals from at least one aircraft maneuver command, the plurality of simulated pilot control signals being generated in accordance with a predetermined control law, the at least one aircraft maneuver command being derived from at least one command telemetry signal received from a remote control system not disposed on the FBW aircraft or from a pre-programmed trajectory, the plurality of simulated pilot control signals being configured to direct the FBW aircraft to perform an aircraft maneuver in accordance with the at least one aircraft maneuver command;
decoupling existing pilot controls from a fly-by-wire flight control system (FBW-FCS) disposed on the aircraft, the FBW-FCS being configured to control aircraft control surfaces disposed on the aircraft; and
connecting the embedded controller to the FBW-FCS.

27. The method of claim 26, wherein the step of providing the embedded controller includes a programming a processor to perform a method for controlling the FBW-FCS comprising:
obtain aircraft flight parameters from the FBW aircraft;
derive at least one reference parameter value from the at least one aircraft maneuver command;
generate an error signal as a function of the aircraft flight parameters and the at least one aircraft maneuver command in accordance with a predetermined control law; and
generate simulated pilot control signals based on the error signal, the simulated pilot control signals being configured to direct the FBW-FCS, whereby the FBW aircraft performs an aircraft maneuver in accordance with the at least one aircraft maneuver command.

28. The method of claim 27, wherein the method for controlling the FBW-FCS is stored on computer-readable firmware disposed in the embedded controller and coupled to the processor.

29. The method of claim 27, wherein the simulated pilot control signals include simulated pitch stick commands, roll stick commands, and rudder pedal commands.

30. The method of claim 27, wherein the simulated pilot control signals include throttle servo commands.

31. The method of claim 30, further comprising the step of providing an electro-mechanical throttle actuator coupled between the embedded controller and an aircraft throttle, the electro-mechanical throttle actuator being configured to move the aircraft throttle in accordance with the throttle servo commands.

* * * * *